Jan. 9, 1951     H. D. HAGSTRUM     2,537,824
MAGNETRON

Filed March 30, 1946     3 Sheets-Sheet 1

INVENTOR
H. D. HAGSTRUM
BY Franklin Mohr
ATTORNEY

Jan. 9, 1951 H. D. HAGSTRUM 2,537,824
MAGNETRON
Filed March 30, 1946 3 Sheets-Sheet 2
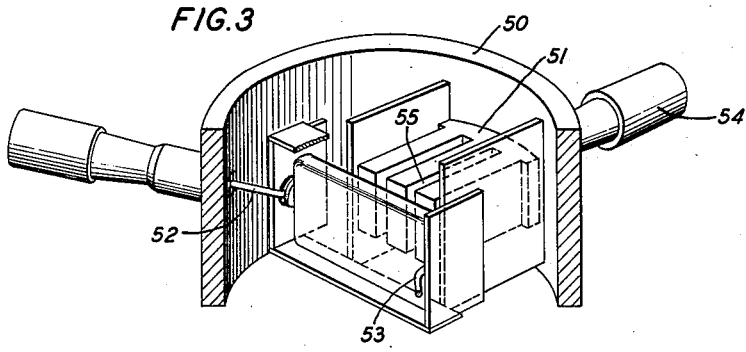
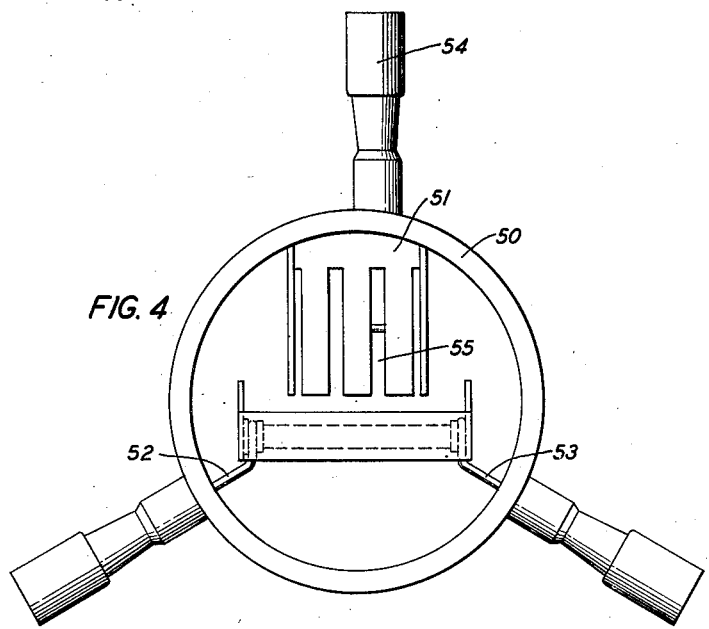
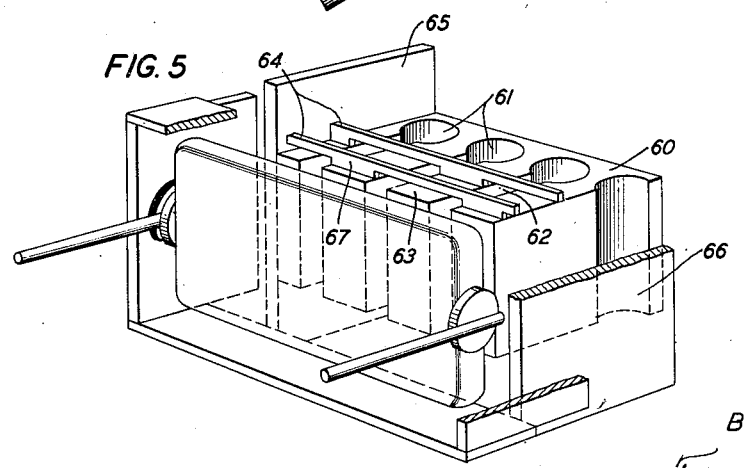
INVENTOR
H. D. HAGSTRUM
BY
Franklin Mohr
ATTORNEY Jan. 9, 1951  H. D. HAGSTRUM  2,537,824
MAGNETRON
Filed March 30, 1946  3 Sheets-Sheet 3
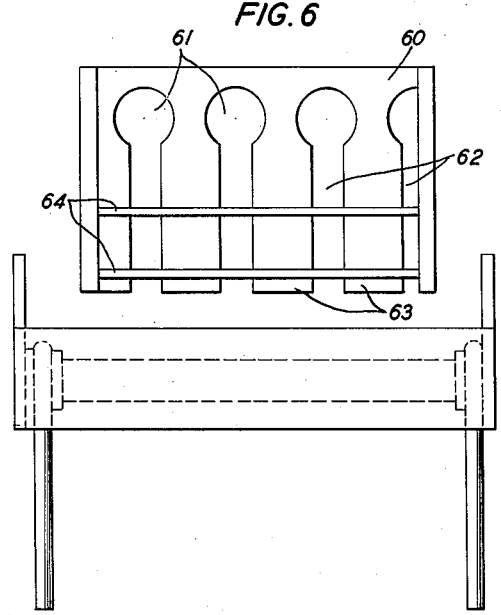
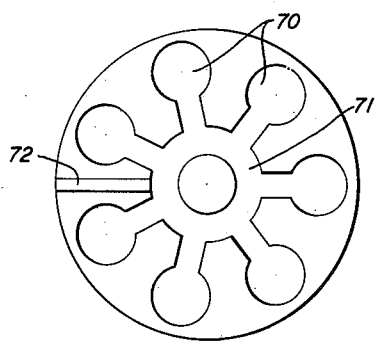
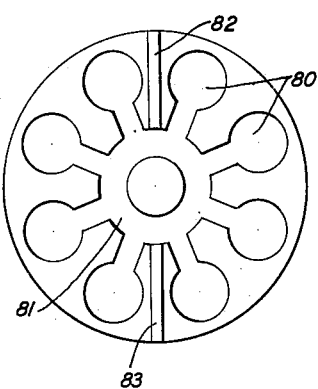
INVENTOR
H. D. HAGSTRUM
BY
Franklin Mohr
ATTORNEY

Patented Jan. 9, 1951

2,537,824

UNITED STATES PATENT OFFICE 2,537,824

MAGNETRON

Homer D. Hagstrum, New York, N. Y., assignor to Bell Telephone Laboratories, Incorporated, New York, N. Y., a corporation of New York Application March 30, 1946, Serial No. 658,430

5 Claims. (Cl. 250—27.5)

The present invention relates to high frequency resonators and discharge devices and more particularly to magnetron oscillators.

A feature of the invention is the use of a plurality of wave reflective plates or flanges which help to confine the oscillating electromagnetic fields in the device within desired limits of space.

Another feature is the use of a cathode of relatively large active area.

A further feature is the location of the cathode leads on the side of the cathode away from the anode in a region substantially outside the region of the oscillating fields.

The scope of the invention is defined in the appended claims while a number of embodiments of the invention are described hereinafter in connection with the drawings, in which:

Fig. 3 is a fragmentary perspective view of another embodiment of the invention;

Fig. 4 is a plan view of the embodiment of Fig. 3, with cover plates removed;

Fig. 5 is a fragmentary perspective view of another embodiment of the invention;

Fig. 6 is a plan view of the embodiment of Fig. 5; and

Figs. 7 and 8 are schematic plan views of two embodiments of the invention in a cylindrical magnetron.

Figure 1:
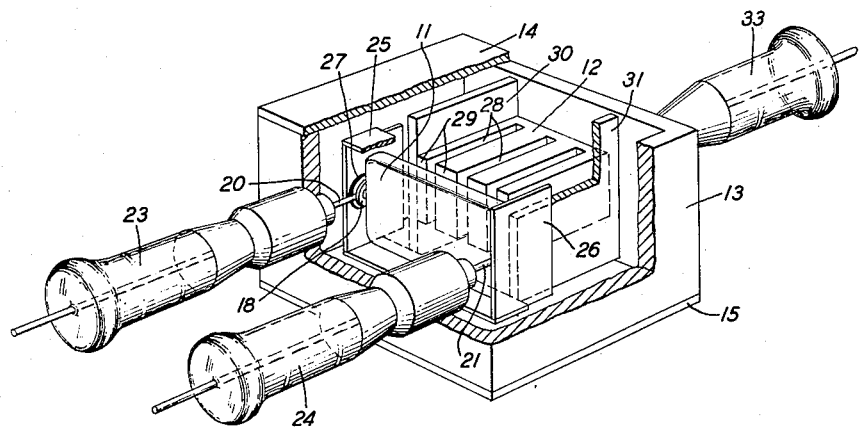
Fig. 1 is a perspective view of an embodiment of the invention in a linear magnetron, the structure of the magnetron being shown partly broken away.
Figure 2:
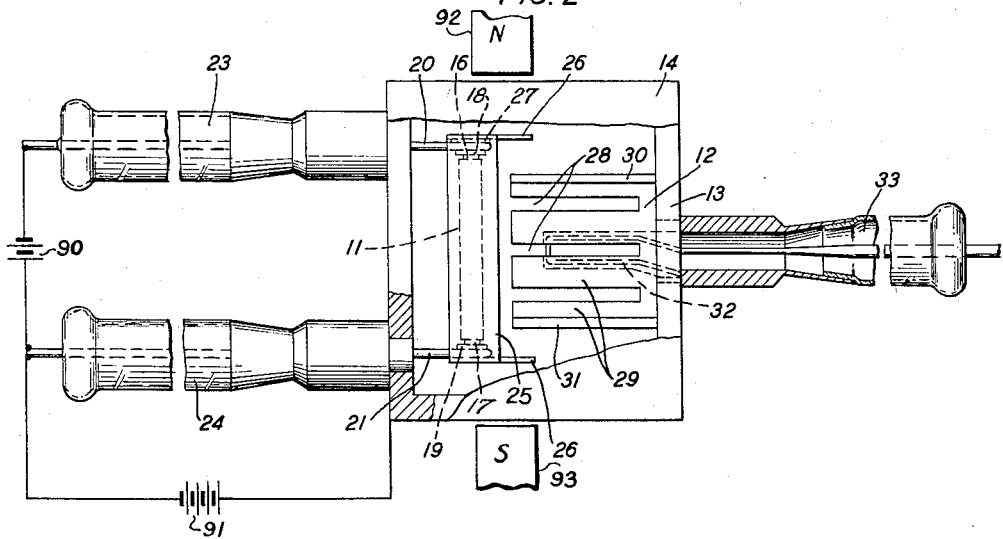
Fig. 2 is a plan view of the structure of Fig. 1 with portions broken away.

Referring to Figs. 1 and 2 there is shown therein an embodiment of the invention in a linear magnetron oscillator. In this embodiment a cathode 11 and an anode 12 are mounted opposite each other within a conductive casing, the latter comprising a side wall portion 13 and a pair of cover plates 14 and 15. A preferred form of cathode is shown presenting a broad flat surface toward the anode and being of sufficient thickness to enclose a heating element of any suitable kind. The cathode is activated, preferably, only on the side toward the anode. The ends of the heating element are shown projecting from the body of the cathode at 16 and 17 and terminating in conductive discs 18 and 19. To the respective discs 18 and 19 are conductively attached a pair of leads 20 and 21, respectively, which are brought out through the wall 13 by means of any suitable insulating vacuum-tight seal as shown at 23 and 24 and connected to a filament heating battery 90. A combination cathode shield and electron intercepting electrode or electron trap is shown at 25, partially surrounding the cathode. The member 25 is further provided with extended tabs 26 overlapping the ends of the anode 12. The lead 20 is insulatingly attached to the member 25 by means of an insulator 27. The lead 21 may be conductively attached to the member 25.

The anode 12 is provided with a plurality of slots 28, the open ends of which are adjacent to the cathode 11. These slots 28 serve to define anode segments 29 bordering upon the slots. End plates, wave reflectors or flanges 30 and 31 are conductively attached to the anode 12, extending above and below the surfaces of the anode. The anode is conductively attached to the wall 13.

An output loop 32 is inserted through a slot in the wall 13 and anode 12, the loop having magnetic coupling with one of the slots 28 and a connection to the loop being brought out through a vacuum-tight fixture 33.

The structure of Figs. 1 and 2 may be operated in the usual manner of a magnetron oscillator as by impressing a suitable steady potential difference from a battery 91 connected between the anode 12 and the cathode 11, with the anode at the positive potential, and by applying a steady magnetomotive force in the vertical direction in Fig. 1 and perpendicular to the plane of the drawing in Fig. 2 as by means of magnets 92 and 93. The action of the device is characterized, as is usual with magnetrons, by curved electron trajectories. In general it may be said that groups of electrons are caused to pass close to the open ends of the slots 28, thereby inducing electromagnetic waves within the slots 28, or electric currents in the segments 19, or both. Because of the flat structure of the cathode 11, the presence of the cathode shield 25 and the anode end plates 30 and 31, and the general configuration of the device, it will be evident that the electromagnetic field pattern during oscillations is substantially confined to a region on the side of the cathode away from the leads 30 and 21, this region being bounded at its ends by the plates 30 and 31. The end plates serve to reflect electromagnetic waves and hence to establish a standing wave pattern in the region. In this way the structure differs radically from the usual cylindrical type of magnetron in which the oscillating fields form a pattern of an endless ring around the cathode, and the anode completely surrounds the cathode, the leads from the cathode being brought out through the end spaces.

The linear type of magnetron illustrated in Figs. 1 to 6, inclusive, however, may be regarded in many respects as an unrolled form of the circular cylindrical magnetron.

It will be noted that in the cylindrical magnetron the cathode leads pass through the region of the electromagnetic field at the end of the anode. In the structure of Figs. 1 and 2 this condition would correspond to bringing the cathode leads out through the space between the end plates 30 and 31 either above or below the anode 12 between the upper or lower surface of the anode and one of the top and bottom plates 14 and 15. The structure according to the present invention avoids bringing the cathode leads through any region in which there is an appreciable intensity of the electromagnetic field.

While flat cathode and anode faces are preferable it will be evident that these elements may have curved surfaces, if desired.

In the embodiment of Figs. 1 and 2, each end plate is located in a vertical plane bisecting an anode segment. Accordingly, the anode may be described as terminated at mid-segment by the end plates. Other terminations such as mid-slot or intermediate may be employed and the terminations at the two ends of the anode need not be the same. The choice of termination provides a means to control the form of standing wave pattern which can be sustained in the device.

Another embodiment of the invention is illustrated in Figs. 3 and 4, in which a circular side wall 50 is substituted for the rectangular wall 13. The anode 51 in this embodiment has a curved rear surface to conform with the inner surface of the wall 50. The slots at the extreme ends of the anode block are shown half as wide as the intermediate slots, the termination of the anode 51 being at the middle of a slot, that is, a mid-slot termination. The cathode leads are shown at 52 and 53 and are brought out of the circular wall at an angle of approximately 120 degrees. As in the case of the embodiment of Figs. 1 and 2, the output is coupled to one of the slots. An output coupling fixture 54 is therefore shown a little to one side of the center of the anode 51 in order to align with one of the slots, namely, slot 55.

The operation of the structure of Figs. 3 and 4 is similar to that of the embodiment shown in Figs. 1 and 2. Cover plates and details of construction of some of the features are omitted to promote clarity in the drawings.

In Figs. 5 and 6 there is illustrated still another embodiment of the invention. In these figures only the anode and cathode assemblies are shown, and anode 60 is provided with cylindrical perforations 61 and slots 62 which together form resonating circuits which function similarly to the slots 28 of uniform width shown in Figs. 1 to 4 inclusive. Between the slots 62 are segments 63. The termination of the anode 60 is illustrated as mid-segment at one end and mid-slot at the other. A pair of mode-locking straps 64 are shown connecting preferably non-adjacent segments. These straps 64 are conductively attached at their respective ends to end plates 65 and 66 which are in turn conductively attached to the anode 60 in the same manner as the plates 30 and 31 are attached to the anode 12 in the embodiment of Figs. 1 and 2. These straps 64 are shown with tabs 67 which may be soldered to the respective segments 63 or which may be inserted into a groove in the surface of the segment. The straps 64 are cut away between the tabs 67 in order to provide clearance and insulation from the intervening segments.

An advantage of the linear form of magnetron over the cylindrical lies in the relatively greater cathode area which may be employed. Corresponding to any cylindrical anode of given circumference there may be constructed a linear anode of length equal to the circumference of the cylindrical anode and having the same number of slots. The area which the linear anode presents toward the cathode and hence the cathode area which may be utilized is greater than in the case of the cylindrical magnetron by a factor determined by the ratio between the outer diameter of the cylindrical anode and the diameter of the interaction space.

The reflective plates or flanges of the invention are applicable to cylindrical magnetrons in the same manner as to the linear type. Illustrative examples of the application to a cylindrical magnetron are shown schematically and in plan view in Figs. 7 and 8.

Fig. 7 represents the anode block of a cylindrical magnetron, the block having seven perforations or slots 70 communicating with a central interaction space 71. A single wave reflective plate or flange 72 is mounted radially upon one of the anode segments, or generally parallel to one of the slots. The plate 72 has the effect of converting the cylindrical anode into the equivalent of a linear anode with wave reflective means at each end. The two sides of the plate 72 act jointly as a pair of end plates.

Fig. 8 represents the anode block of a cylindrical magnetron with eight slots 80 and an interaction space 81. Two wave reflective plates or flanges 82 and 83 respectively are shown, located diametrically opposite each other. The plates 82 and 83 effectively divide the anode into two linear anodes with four slots apiece and having the equivalent of wave reflective means at each end.

Many other applications of the reflective plates and other features shown herein either to linear or to cylindrical magnetrons as well as other structural variations in either type may be made without exceeding the scope of the invention. Furthermore, a resonator or discharge device in accordance with this invention may be excited or operated in any suitable manner by either electrical or magnetic means, or by any combination thereof.

What is claimed is:

1. A discharge device comprising a sheet cathode, one side only of which is activated, an anode block mounted opposite said activated side of said anode, said anode block having open-ended slots therein forming resonators, the open ends of the slots in said anode being adjacent to said cathode, a shielding structure partially surrounding said cathode, for substantially preventing the electromagnetic field of said anode from extending to the side of said cathode away from said anode, and a cathode connecting lead extending from said cathode on the side away from said anode, said lead being shielded from the electromagnetic field of said anode by said shielding element.

2. A discharge device comprising a sheet cathode having only one active side, a cavity resonator comprising a conductive block anode mounted opposite said active side of said cathode and having slots therein opening toward said cathode, a pair of end plates attached to said anode and extending beyond the edges of said anode for reflecting electromagnetic waves emerging from said anode, shielding means for said cathode, said shielding means overlapping said anode end plates to aid in confining the electromagnetic field of said anode to the side of said cathode toward said anode, and a cathode lead extending from said cathode on the side thereof away from said anode.

3. A linearly extended conductive block having transverse slots therein defining segments between said slots, a wave reflective plate conductively attached to said block and extending beyond the edges thereof, and a strap interconnecting a plurality of said segments, said strap having one end conductively joined to said wave reflective plate.

4. An anode block having two faces parallel to each other and a third face perpendicular to said parallel faces, said anode block having slots therein, said slots opening through said two parallel faces and through said third face, and a wave reflective flange attached to and projecting substantially perpendicularly outwardly from one of said parallel faces, said flange extending perpendicularly to said third face.

5. An anode block having two faces parallel to each other and a third face perpendicular to said parallel faces, said anode block having slots therein, said slots opening through said two parallel faces and through said third face, and a pair of parallel wave reflecting flanges attached to and projecting substantially perpendicularly outwardly from one of said parallel faces, said flanges extending perpendicularly to said third face.

HOMER D. HAGSTRUM.

REFERENCES CITED

The following references are of record in the file of this patent:

UNITED STATES PATENTS

| Number | Name | Date |
| --- | --- | --- |
| 2,075,855 | Kilgore | Apr. 6, 1937 |
| 2,084,867 | Prinz et al. | June 22, 1937 |
| 2,219,117 | Schade | Oct. 22, 1940 |
| 2,289,952 | Zworykin | July 14, 1942 |
| 2,412,824 | McArthur | Dec. 17, 1946 |
| 2,417,789 | Spencer | Mar. 18, 1947 |
| 2,428,612 | Blewett | Oct. 7, 1947 |
| 2,444,435 | Fisk | July 6, 1948 |
| 2,446,826 | McArthur | Aug. 10, 1948 |